United States Patent [19]

Wood et al.

[11] 4,247,317

[45] Jan. 27, 1981

[54] GLASSWARE FORMING MACHINE COMPUTER-RAM CONTROLLER SYSTEM

[75] Inventors: Charles L. Wood; Stephen W. Daudt, both of Muncie, Ind.

[73] Assignee: Ball Corporation, Muncie, Ind.

[21] Appl. No.: 898,212

[22] Filed: Apr. 20, 1978

[51] Int. Cl.³ .............................................. C03B 9/40
[52] U.S. Cl. ........................................ 65/29; 65/158;
65/163; 65/164; 65/DIG. 13; 364/473;
364/476
[58] Field of Search .................. 65/158, 163, 164, 29,
65/DIG. 13; 364/473, 476

[56] References Cited

U.S. PATENT DOCUMENTS

| | | | |
|---|---|---|---|
| 3,264,397 | 2/1966 | Glickman et al. | 340/172.5 |
| 3,334,334 | 8/1967 | Halpin | 340/172.5 |
| 3,634,660 | 1/1972 | Moran et al. | 65/DIG. 13 |
| 3,659,974 | 5/1972 | Neugroschl | 425/29 |
| 3,701,113 | 10/1972 | Chace et al. | 340/172.5 |
| 3,719,931 | 3/1973 | Schroeder | 340/172.5 |
| 3,723,975 | 3/1973 | Kurtz et al. | 340/172.5 |
| 3,753,243 | 8/1973 | Ricketts, Jr. et al. | 340/172.5 |
| 3,810,104 | 5/1974 | Markley | 340/172.5 |
| 3,827,030 | 7/1974 | Seipp | 340/172.5 |
| 3,849,765 | 11/1974 | Hamano | 340/172.5 |
| 3,905,793 | 9/1975 | Croughwell | 65/DIG. 13 |
| 4,108,623 | 8/1978 | Cárdenas-Franco | 65/163 |
| 4,152,134 | 5/1979 | Dowling et al. | 364/473 X |

OTHER PUBLICATIONS

Glass Machine Programming Systems by Dr. A—L. Johnson, Feb. 19, 1969, from Glass Container Research System, (20 pages).

*Primary Examiner*—Arthur D. Kellogg
*Attorney, Agent, or Firm*—Cushman, Darby & Cushman

[57] ABSTRACT

A programmable automatic controller for operating a section of a glassware forming machine having a plurality of components which operate in a timed or sequential relationship with one another. The controller includes a timing means for generating a digital signal in synchronism with the operation of the machine, wherein the digital signal provides an instantaneous indication of the time elapsed in each cycle of operation of the machine. A random access memory (RAM) stores the status of every section component at each increment of time during each cycle of machine operation. The digital signal addresses the RAM so that the statuses of all components for the corresponding time are directed to drivers which provide component enable or inhibit command signals.

Control means for adjusting the actuation and deactuation times of the section components provide information of a computer which updates an internal memory table organized similarly to the RAM. The computer also controls the transfer of data from the internal table to the RAM in such a way that the data updating speed of the control computer is independent of the machine cycle speed.

18 Claims, 7 Drawing Figures

Fig. 3

| Degree Nos. | 00 | 01 | 02 | 03 | 04 | 05 | 06 | 07 | 08 |
|---|---|---|---|---|---|---|---|---|---|
| 0 | | | 0 | | | | | | |
| 1 | | | 0 | | | | | | |
| 2 | | | 0 ← DATA BITS | | | | | | |
| 3 | | | 1 | | | | | | |
| 4 | | | 1 | | | | | | |
| 5 | | | 1 | | | | | | |
| 6 | | | 1 | | | | | | |
| 7 | | | 1 | | | | | | |
| 8 | | | 1 | | | | | | |
| 9 | | | 1 | | | | | | |
| 10 | | | 0 | | | | | | |
| 11 | | | 0 | | | | | | |
| 12 | | | 0 | | | | | | |
| 13 | | | 0 | | | | | | |
| 357 | | | 0 | | | | | | |
| 358 | | | 0 | | | | | | |
| 359 | | | 0 | | | | | | |

Fig. 4

MAIN PROGRAM
START → PERFORM INITIALIZATIONS → OPERATOR CONTROL ROUTINE → SERVICE CONSOLE CONTROL ROUTINE → SERVICE TABLE OUTPUT ROUTINE → (loop back)

GLASSWARE FORMING MACHINE COMPUTER-RAM CONTROLLER SYSTEM

It has been customary in the past to provide two molds in each section of an individual section machine whereby a gob is received in a first mold called the blank or parison mold for the initial process of forming a parison, followed by a transfer of the parison to a second mold called the blow mold for final blowing of the article. By this means, each section of the machine is operating simultaneously upon two workpieces. In order to control the operation of the various functional components in each section of a glassware forming machine, a means must be provided for actuating each of the section components in a preselected cyclic time format so that the operation of one component does not interfere with, but rather complements, the operation of the other components in the section. In addition, means must be provided for interrelating the timing of the individual sections with respect to a machine standard.

The several functional components of the glassware forming stations of the individual section machine are typically controlled by pneumatic pressure which is controlled by either a mechanical synchronizing means in the form of rotary drums or by an electronic timing circuit. An example of the prior art controller utilizing mechanical synchronizing means is disclosed in Ingle, U.S. Pat. No. 1,911,119. The Ingle glass forming machine is cumbersome and more importantly, is difficult to adjust so that the timing of the operation of the various components of the machine can be varied. An example of the prior art controller utilizing electronic timing circuits is U.S. Pat. No. 3,762,907 to Quinn et al and U.S. Pat. No. 3,969,703 to Kwiatkowski et al, both of which are assigned to the common assignee herewith. Some prior art controllers do not include an easy, simplified means for adjusting the time of operation of the various elements in a machine cycle while the machine is operating and accordingly, lacks the flexibility desired in an automatic controller.

In addition, a number of the prior art controllers, including the two electronic controllers disclosed in the above patents, have storage means wherein the component activation/deactivation times are stored in locations which through appropriate processing define the particular component. For each incrementation of cycle time, the incremented time is compared with the contents of at least one location of the storage means. A favorable comparison produces an enable signal, updating the contents of an appropriate component control latch and, therefore, the status of the component. The number of electrical components necessary to execute the above scheme is large, and the interconnection of the electrical components is complex.

A further drawback of some prior art controllers is that the adjustment of the timing of operation of the various components in a machine cycle is related to the actual cycle time. Data can only be entered in the storage means during a fixed period of each cycle. Inflexibility of operation and the possibility of delay in the updating of data results.

It is, therefore, an object of this invention to provide a flexible programmable automatic controller for operating the glassware forming machine.

It is another object of this invention to provide an automatic controller having a simplified and efficient means for adjusting the time of actuation of the operational components of a glassware forming machine with a high degree of accuracy while the machine is running.

It is still a further object of this invention to provide an automatic programmable controller with means for remotely adjusting the component actuation times.

It is yet another object of this invention to provide an automatic controller wherein the data updating speed of the system is independent of the machine cycle speed.

A still further object of this invention is to provide an automatic programmable controller wherein the status of each of the operational components of a glassware forming machine is stored in a storage means at a location indicative of the machine cycle time to which the stored status relates.

SHORT STATEMENT OF THE INVENTION

Accordingly, this invention relates to a programmable automatic controller for operating glassware forming sections, each having a plurality of functional components which operate in a timed relationship with respect to one another. More specifically, the automatic controller includes timing means for generating a digital signal in synchronism with the operation of the machine being controlled wherein the digital signal provides an instantaneous indication of the time elapsed in each cycle of operation of the machine. A storage device in the form of a random access memory (RAM) stores the operational status of every component at each increment of time as defined by the digital signal. The status is stored at a location indicative of the machine cycle time to which the stored status relates. The digital signal addresses the RAM so that the statuses to all components for the corresponding times are directed to drivers which produce actuation signals for the various section components.

It is often desirable, in controlling the operation of a glassware forming machine, to vary the time during which a particular section component is to be actuated. Accordingly, a microcomputer is connected to the RAM, and is responsive to control means. Variations in component actuation times, entered on the control means, alter the contents of a data table internal to the microcomputer, which data table is organized in a manner similar to the RAM. The microcomputer then controls the transfer of data from the internal data table to the RAM. Thus, the data updating speed of the control computer is independent of the machine cycle speed.

BRIEF DESCRIPTION OF THE DRAWINGS

Other objects, features and advantages of the present invention will become more fully apparent from the following detailed description, the appended claims and the accompanying drawings, in which:

FIG. 3 is a schematic representation of the manner in which data is stored in the RAM data table;

FIG. 4 is a flow diagram illustrating the relationship of the subroutines that control the operation of the microcomputer;

DETAILED DESCRIPTION OF THE PREFERRED EMBODIMENT

Figure 1:
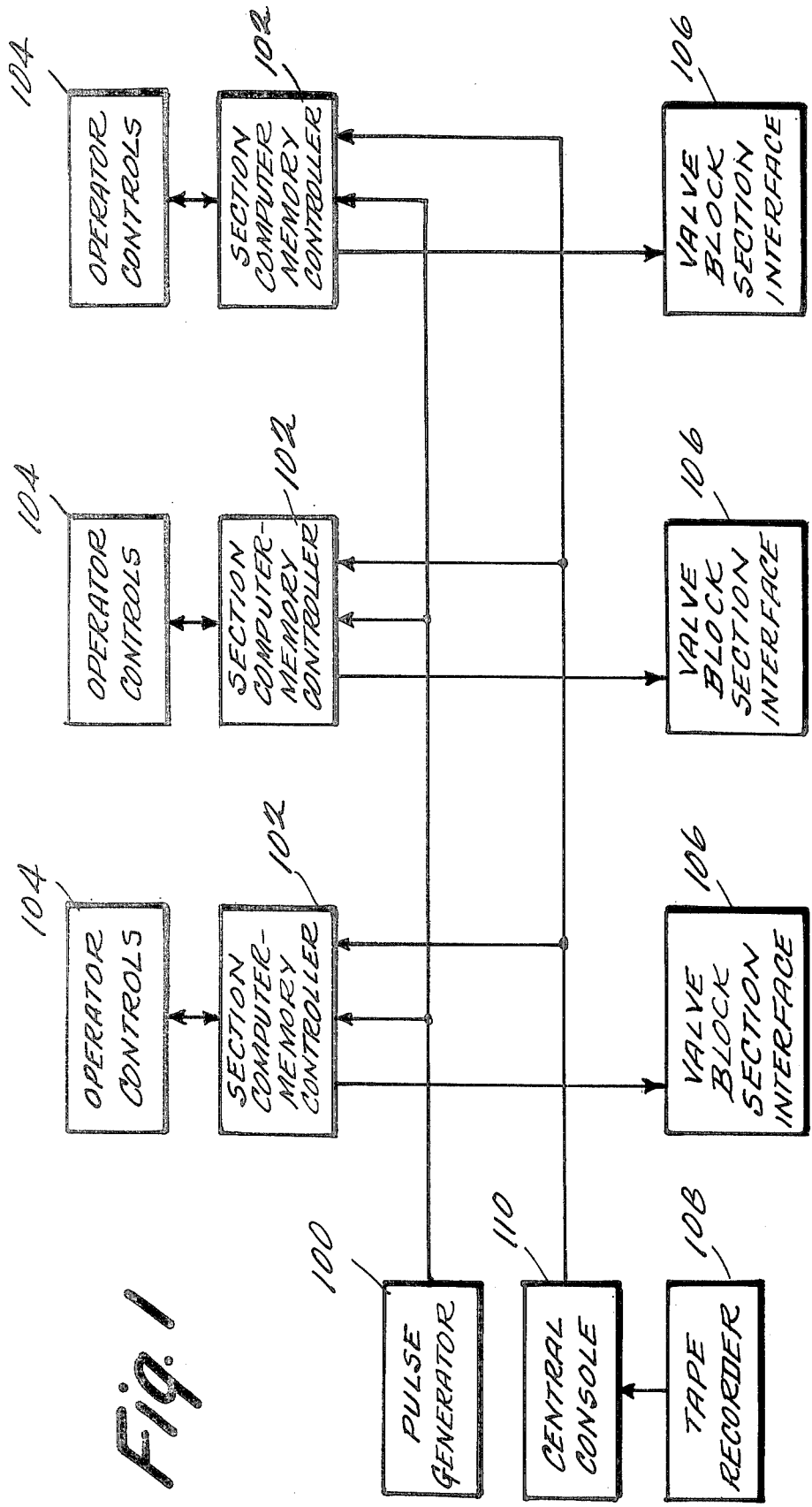
FIG. 1 is a block diagram of the programmable automatic controller system of the present invention.

FIG. 1 illustrates a block diagram of the computer-RAM controller system of the present invention. Pulse generator 100 provides a train of clock pulses and a reset pulse at the completion of the machine cycle. The generator operates on a machine cycle base wherein 360 clock pulse intervals are provided per cycle. In the preferred embodiment, the pulse generator includes a suitable conventional pulse generating means mounted on the drive shaft of the glassware forming machine and generates two pulse trains. The first pulse train provides a cycle clock pulse for every degree of machine rotation and the second clock pulse training provides one pulse per machine revolution. Thus, assuming that the machine being controlled operates through a predetermined cycle, one pulse is generated at the beginning of each machine cycle and another pulse train is generated every 1/360th of a machine cycle.

The output of pulse generator 100 is coupled to each of a plurality of individual machine section computer-memory controllers 102. Each controller unit includes storage, addressing, and updating circuits which, when arranged as described hereinbelow, determine which components of the section being controlled are to be activated or deactivated at any given time. In addition, each section controller 102 includes means for processing the output of operator controls 104.

Operator controls 104 include a degree display for instantaneously displaying the "on" or "off" times for a selected function. Means are included for controlling the changing of the relative actuation times of a selected function. Also, operator controls 104 include means for changing the relative time relationship of the operation of a given section to the machine. The design of the controller is such that it may be positioned near the machine being controlled so that the operation of the machine can be monitored while the various control functions in operator control 104 are being changed.

The output of each of the section controllers 102 is coupled to an associated valve block section interface 106 which provides the mechanical drive means for the section being controlled. If, for example, the glassware forming machine being controlled is operated on a pneumatic basis, valve block interface 106 might include a number of valves which are controllable by solenoid actuators, the solenoid actuators being controlled in turn by the output of section controllers 102. A detailed description of valve block section interface 106 will not be presented herein, because actuators and valves for operating machine components are known in the art and because of the applicability of the control system of the present invention to different glassware forming machines, each having a different valve block section interface structure.

Tape recorder 108 is provided, which stores operational commands generated by a decimal keyboard. Thus, if the sections being controlled are to be operated in a number of different modes, each particular program mode may be stored on tape until it is utilized. The output of the tape is coupled to central console 110 which provides dual operator controls so that the variables of all sections under the control of central console 110 may be altered from a central location.

The central console controls the volative timing of each of the sections of the machine and is capable of overriding individual operator controls 104. In addition, as each of the individual sections are operated under the control of their associated section controllers 102, the section controller may provide an output to central console 110 for verifying the order in which the respective components in the machine are actuated. This information may be stored in tape recorder 108 for future use.

Figure 2:
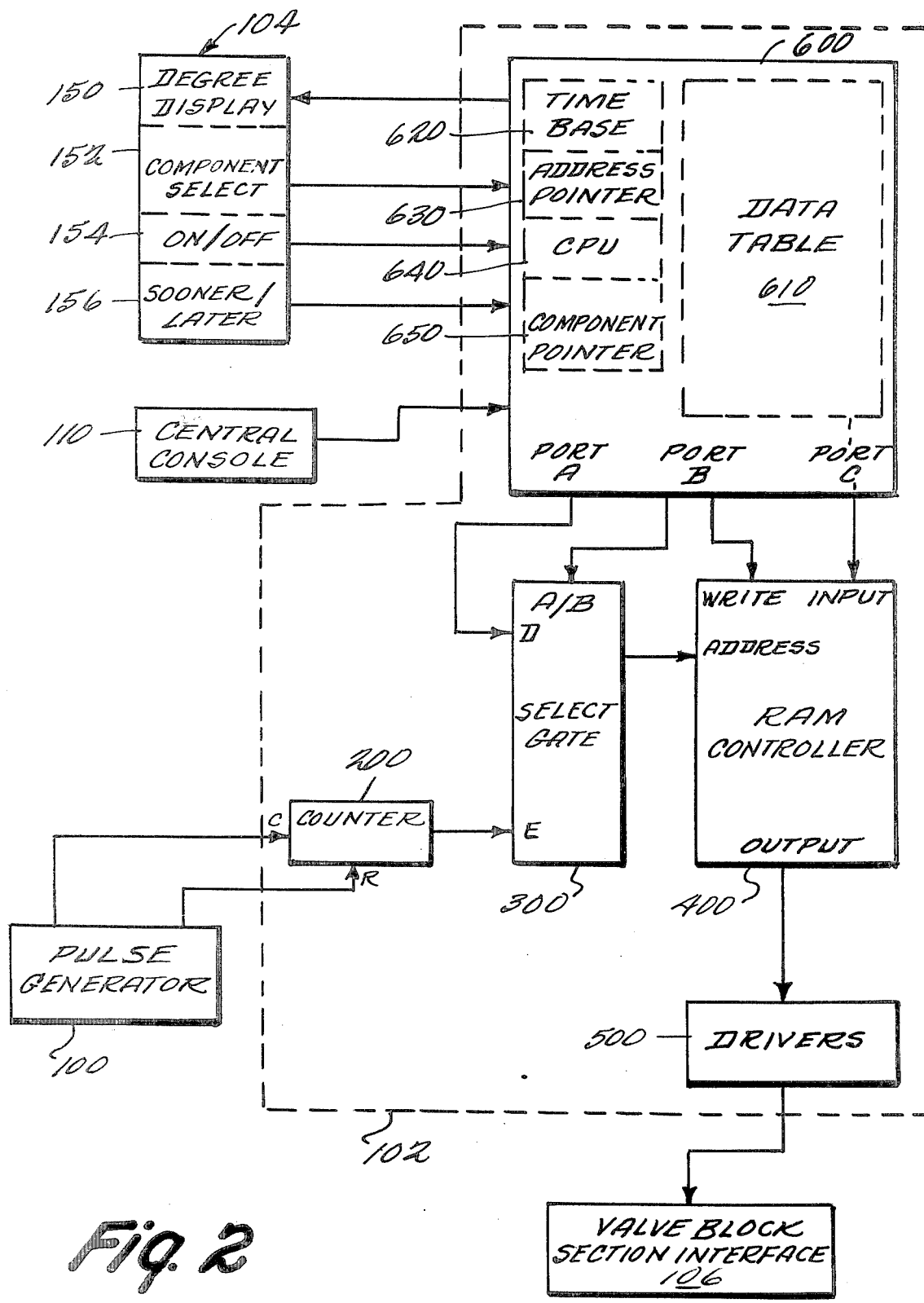
FIG. 2 is a schematic representation of the section computer-memory controller and operator controls of the programmable automatic controller for an individual section.

FIG. 2 illustrates a more detailed representation of section computer-memory controller 102. The reset pulse from generator 102 resets timing means 200 which may be an ordinary counter responsive to clock pulses from pulse generator 100 to produce a digital signal providing an instantaneous indication of the time elapsed in each cycle of operation of the machine being controlled. The output of counter 200 is applied to select gate 300, which may be any select gate well known in the art for selectively transferring signals from one of two inputs to its output in accordance with a control signal. In formal operation, the signal at port E of select gate 300 is transferred to the output thereof.

The digital signal output of counter 200 is applied through select gate 300 to storage means 400. In the preferred embodiment, storage means 400 is a random access memory (RAM), and may be made of complementary metal-oxide semiconductor (CMOS) components in order to minimize power consumption. RAM 400 has an address input for accessing a particular location in the RAM, a data output port to which the accessed data is applied, a data input port and a write command input for controlling the transfer of data from the input port to the location specified by the address port for storage.

FIG. 3 illustrates the organization of RAM 400. Each row preferably represents one address whereat the status of each component is stored for a particular time as represented by the address. Each column of the data table represents the status of one component at every time in a machine cycle. Thus in FIG. 3, the status of component 02 which may, for example, be a baffle, is represented for each of the 360 time increments in each cycle. The numeral 1 represents an "on" status, while the numeral 0 represents an "off" status. Thus component 02 is designated to turn on between time periods 2 and 3, and turn off between time periods 9 and 10. The digital signal from counter 200 addresses one row of the data table as indicated in FIG. 3, during each time increment. When addressed the row appears at the output port of RAM memory controller 400.

Ideally, storage means 400 is a 360 by Z RAM (where Z equals the maximum possible number of components to be controlled) with separate inputs and outputs; however, such a RAM would have to be custom-made. As an alternative, any 1,024 by one bit static RAM (such as the Model 2102 manufactured by Intel) could be used for each component to be controlled. Alternatively, two 256 by 4 RAMS (such as either the Model 5101 or 2101A both manufactured by Intel) could be used to store the statuses of four components, wherein two two RAMS have parallel outputs. In this embodiment, all but one address line could be applied to the address ports of both clips, with the remaining address line being applied to the output disable terminals of both chips so as to prohibit the output of the inappropriate chip.

The signals at the output of RAM 400 are applied to drivers 500 which provide the necessary current and filtering to operate valve block section interface 106.

Thus, in normal operation, pulse generator 100 supplies pulses to timing means in the form of counter 200, the output of which addresses RAM memory controller 400. The address location contains the status of the section being controlled for the time indicated by the output of counter 200. The section status is supplied to drivers 500 which produce signals for actuating valve block section interface 106.

Microcomputer 600 provides unit intelligence for updating the data in RAM 400 through an internally stored program which monitors operator controls 104 and central console 110, controls select gate 300 and provides data to RAM memory controller 400. While any suitable commercially available microcomputer may be used, the P.D.P. 1103 manufactured by Digital Equipment Manufacturing, or the Model 8080 or 8085 manufactured by Intel are satisfactory. The P.D.P. 1103 also includes a RAM that would be suitable as RAM 400. Microcomputer 600 includes a central processing unit (CPU) 640, and a read/write memory divided into a data table 610, time base 620, address pointer 630, and component pointer 650. Data table 610 is organized in the same manner as RAM controller 400. CPU 640 performs all instructions stored in a program memory in microcomputer 600, manipulates and stores data and controls input/output transfers. Time base 620 stores the output of either an up or a down (depending on the precise microcomputer used) counter which is incremented by an oscillator located either on board or external to microcomputer 600. Address pointer 630 represents a location in the read/write memory of microcomputer 600 which contains the address of data table 610 currently being accessed. Component pointer 650 is also a location in the read/write memory of microcomputer 600 and contains a code indicative of a section component selected by the operator through operator controls 104.

Microcomputer 600 communicates with a number of the other components of the controller system. Data is transferred from data table 610 to RAM controller 400 through port C of microcomputer 600. Port A transfers an address from address pointer 630 to input D of select gate 300. Port B provides a write command to RAM controller 400 and an input select signal to select gate 300.

Component select 152 of operator controls 104 provides a signal to CPU 640 of microcomputer 600 which component select signal is stored in component pointer 650. On/off control 154 of operator controls 104 operates a signal indicative of whether the actuation or deactuation time of a given component is to be displayed and/or altered. Sooner/later control 156 of operator controls 104 supplies a signal to microcomputer 600 indicating the direction and the amount by which a turn on or turn off time is to be altered. In the preferred embodiment, sooner/later control 156 comprises two push buttons, a "sooner" push button and a "later" push button, which may be depressed until the actuation or deactuation time has been changed by the desired amount as indicated by degree display 150. Microcomputer 600 also supplies a signal to the degree display 150 portion of operator controls 104 so that the degree at which the component selected by component select 152 is actuated or deactuated, as selected by on/off control 154, is displayed.

The type of communications described above between operator controls 104 and microcomputer 600 can also occur between central console 110 and microcomputer 600. In addition, the delay of a section being controlled with respect to the machine can also be set on central console 110 as described below.

FIGS. 4–7 represent the operation of microcomputer 600 in performing the functions of the glassware forming machine controller. FIG. 4 illustrates the main outline of operations of microcomputer 600. Upon the start, an initialization step is performed. After initialization, the operator control routine is serviced.

Figure 5:
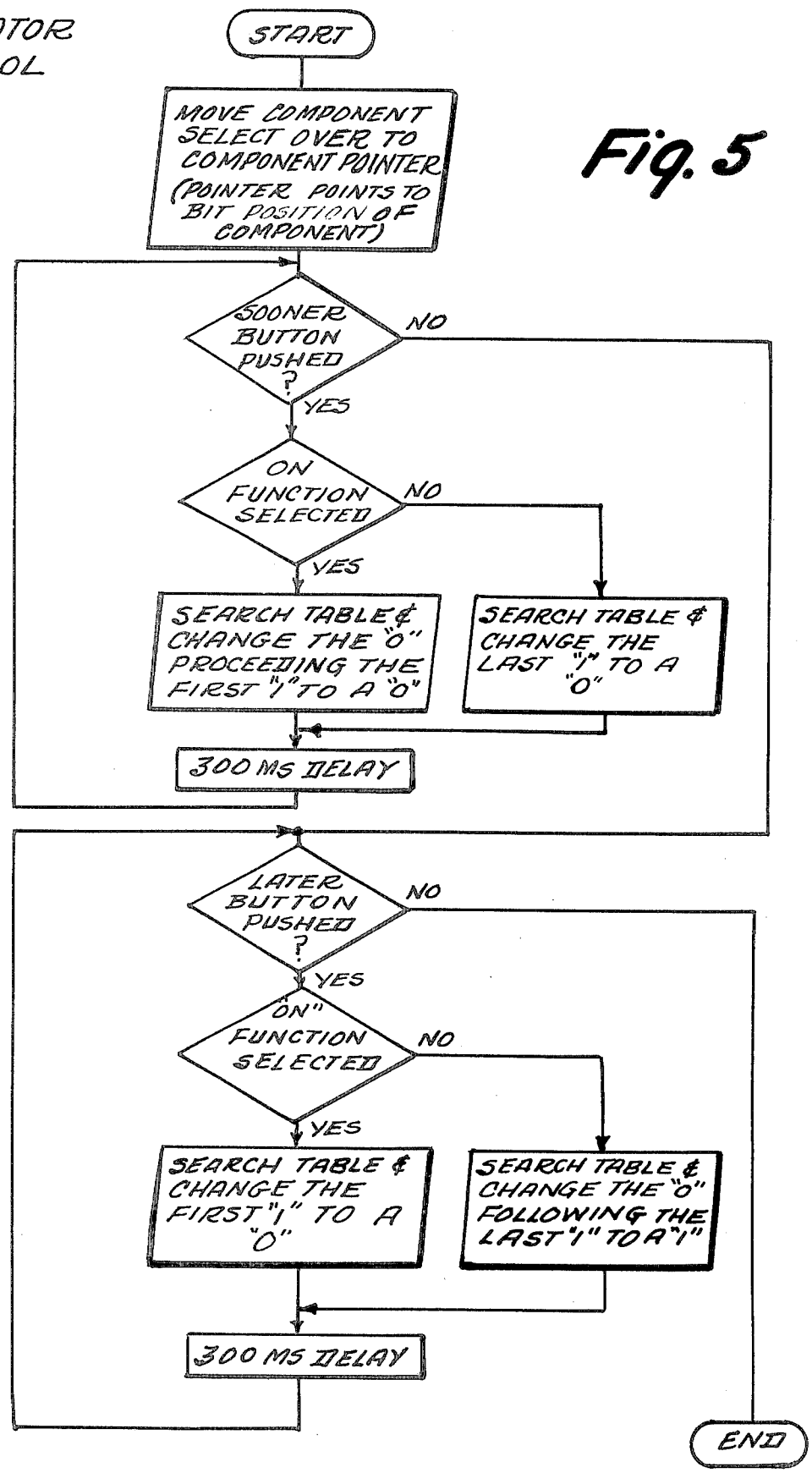
FIG. 5 is a flow diagram of the operator control routine.

As illustrated in FIG. 5, upon entry of the operator control routine, CPU 640 commands that the component select code generated by component select means 152 (FIG. 2) be applied to component pointer 650 which points to the column of data table 610 associated with the given component select code. CPU 640 then receives the signal from sooner/later control 156 and determines whether the "sooner" button is depressed. If it is, CPU 640 then checks the signal from on/off control 154 to determine whether the "on" function has been selected. If the "on" function has been selected, the columns of data table 610 indicated by component pointer 650 (as represented in FIG. 2) is searched and the "0" preceding the first "1" is changed to a "1" so that data table 610 indicates that the particular component is to be turned on at an earlier time. After a 300 millisecond delay, CPU 640 checks again to see whether the "sooner" button is depressed.

If the "on" function has not been selected, obviously the "off" function has been selected. CPU 640 causes the appropriate component column of data table 610 (as identified by component pointer 650) to be searched and the last "1" is changed to a "0", so that table 610 indicates that the particular component is to be turned off earlier in the cycle. After a 300 millisecond delay, CPU 640 checks to see if the "sooner" button is depressed.

If the "sooner" button has not been pushed, CPU 640 determines whether the "later" button is depressed. If it is not, CPU 640 leaves the operator control routine and returns to the main program of FIG. 4. If the "later" button is depressed, CPU 640 then determines whether the "on" function has been selected. If the "on" function has been selected, CPU 640 causes the selected component column of data table 610 to be searched, and the first "1" is changed to a "0", so that the data table 610 is changed to indicate that the "on" function of the selected component occurs later in the cycle. After a 300 millisecond delay, CPU 640 determines whether the "later" button has been depressed.

If the "on" function has not been selected, obviously the "off" function has been selected. CPU 640 causes the appropriate component column of data table 610 to be searched and the "0" following the last "1" is changed to a "1", so that data table 610 indicates that the off time of the particular component occurs later. After a 300 millisecond delay, CPU 640 determines whether the "later" button has been depressed.

Figure 6:
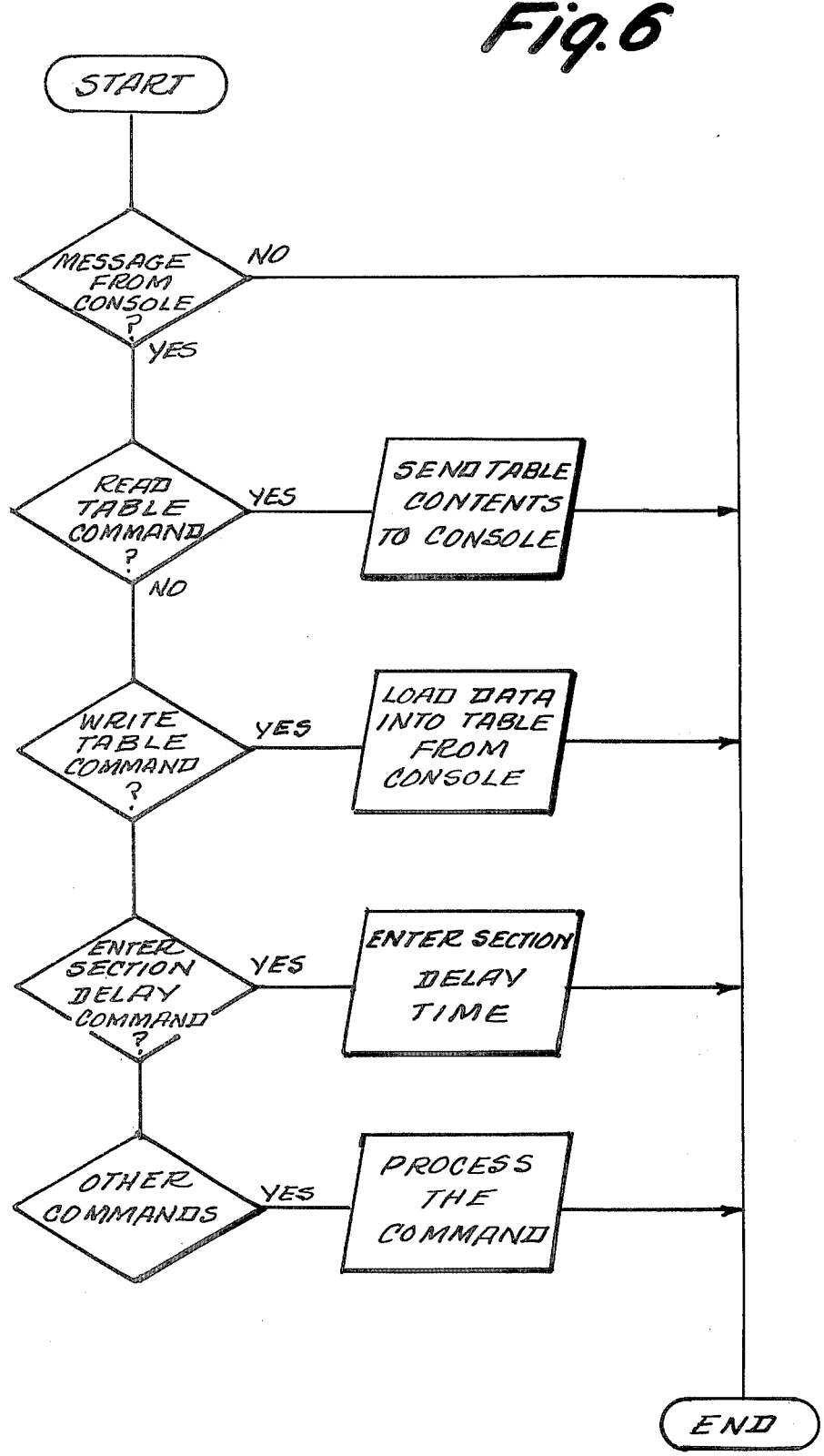
FIG. 6 is a flow diagram of the console control routine.

Once CPU carries out the steps of the operator control routine, CPU 640 then services the console control routine. As illustrated in FIG. 6, upon entry into the console control routine, CPU 640 first determines whether a message has been sent from the central console. If a message has not been sent, CPU 640 returns to the main program of FIG. 4. If a message has been received from the console, CPU 640 determines whether a read table command has been given. If such a command has been given, the contents of data table 610 are sent to central console 110 and CPU 640 returns to the main program of FIG. 4. If a read table command has not been given, CPU 640 determines whether a write table command has been given. If such a command has been given, data from the central console 110 is loaded into data table 610, and CPU 640 then returns to the main program illustrated in FIG. 4.

If a write table command has not been given, CPU 640 then determines whether an enter section delay command has been given. The section delay is the time by which a particular section is delayed from the machine cycle time so that one gob feeder can service all sections of a machine as discussed above. If such a command has been given, the section delay time is entered in an address in the read/write memory of microcomputer 600.

This entry can be utilized to delay the section by any number of ways well-known in the art. For example, the section delay time can be used to delay all of the actuation and deactuation times for all the components stored in data table 610. Alternatively, the output of counter 200 in FIG. 2 can be connected to a comparator, the other input terminal of which is connected to a port containing the section delay time. When a favorable match occurs (i.e., when the machine time has been delayed by the appropriate amount) the output of the comparator can be utilized to reset a second counter which is also clocked by pulse generator 100. The output of the second counter is applied to input gate E of select gate 300.

Returning now to FIG. 6, if an enter section data command has not been given, CPU 640 then determines whether any other commands have been given. These commands could be any commands desired by the user. For example, there might be a maintenance command which would institute self-diagnostic steps. If such another command has been given the command is processed and the CPU 640 returns to the main program illustrated in FIG. 4.

Figure 7:
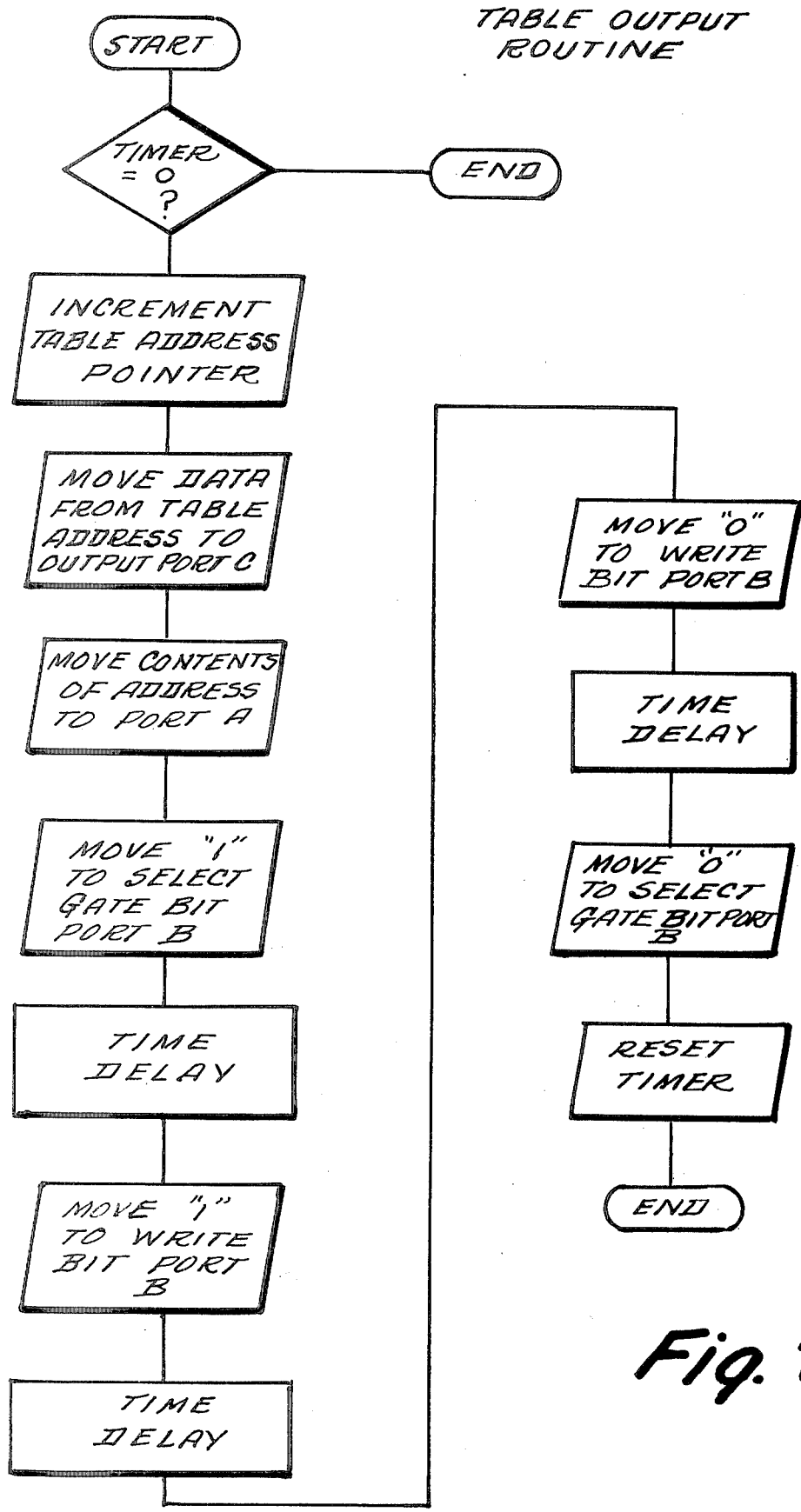
FIG. 7 is a flow diagram of the table output routine.

After the console control routine has been serviced, CPU 640 services the table output routine illustrated in FIG. 7. After entering the table output routine, CPU 640 first determines whether time base 620 contains a "0". As related hereinabove, time base 620 stores the output of an up or a down counter. In the preferred embodiment, a down counter is used. As discussed below, the down counter is periodically reset and then permitted to count down to "0". If the counter has not counted down to "0", CPU 640 returns to the main program illustrated in FIG. 4.

If time base 620 does equal "0", address pointer 630 is incremented. The locations addressed by the incremented pointer are moved from data table 610 to output port C of microcomputer 600. The address stored in the incremented address pointer is supplied to output port A of microcomputer 600. Also, a "1" is moved to select gate input select bit at port B. The "1" on the select gate input select line causes select gate 300 to permit the input data at input port D to be transferred to the output. CPU 640 then delays for a fixed amount of time while the signals at the various ports settle. After the delay, a "1" is moved to the write select bit at port B enabling the data at port C of microcomputer 600 to be inserted in RAM controller 400 at the location specified at output port A of microcomputer 600.

After a time delay to insure that the data is transferred and stored in RAM controller 400, a "0" is applied to the write select bit of port B of microcomputer 600 to disable the writing step. After a further time delay, a "0" is applied to the select gate input select bit of port B, thereby causing select gate 300 to transfer the signal at input port B to the output.

After the time base 620 is reset, the CPU 640 returns to the main program and, accordingly, services the operator control routine.

As new data is being written in RAM controller 400, the new data is also passed to the output and drivers 500. Note that the address applied to input port D of select gate 300 is not necessarily the same as the address applied to input port E of select gate 300. Therefore, the output of RAM controller 400 momentarily contains the statuses relating to another time in the machine cycle. This causes a momentary fluctuation to be applied to drivers 500. However, the very short time that input D of select gate 300 is selected is insufficient to actuate mechanisms within valve block section interface 106, so that the section operation is not disturbed. Alternatively, optical isolators or latches can be interposed between the output of RAM controller 400 and drivers 500 for filtering and/or isolation. If a latch is used, it can be controlled by the select gate input select bit at port B.

In the table output routine illustrated in FIG. 7, the use of time base 620 slows the transfer of data from data table 610 to RAM controller 400, which on the average, causes the operator control routine and the console control routine to be serviced more often. If, in a particular application, the speed of transfer from data table 610 to RAM controller 400 is more important than the average frequency at which operator control routine and the console control routine are serviced, all steps relating to the time base may be eliminated.

Although only a few exemplary embodiments of this invention have been described in detail above, those skilled in the art will readily appreciate that many modifications are possible in the exemplary embodiments without materially departing from the novel teachings and advantages of this invention. For example, RAM controller 400 may be an internal component of the computer. In this case, data would be sent out to drivers 500 via an interrupt routine or direct memory access control. Accordingly, all such modifications are intended to be included within the scope of this invention as defined by the following claims.

What is claimed is:

1. A programmable automatic controller for controlling at least one section of a glassware forming machine, said at least one section including a plurality of movable components which operate in timed relationship with respect to one another, said at least one section forming rigid glassware articles from gobs of molten glass, wherein said movable components are each actuated at respective relative times in each of a plurality of machine cycles, said controller comprising:

timing means for generating a digital signal, said digital signal providing an indication of the time elapsed in each cycle of operation of said machine;

storage means, having an address input and a data output, for storing signals corresponding to the on/off statuses of said plurality of components for each of a plurality of increments of time in each cycle of operation of said machine, each of said increments of time being uniquely indicated by said digital signal;

means for applying said digital signal to said address input;

means for transferring to said data output of said storage means the signals corresponding to the on/off statuses of each of said plurality of components for the cycle time increment defined by the digital signal applied to said address input; and a plurality of component actuating means connected to said data output, each of said component actuating means being associated with at least one on/off status signal in each time increment and being responsive to each of said status signals at each time increment for controlling the operation of said components.

2. A programmable automatic controller for controlling at least one section of a glassware forming machine, said at least one section including a plurality of movable components which operate in timed relationship with respect to one another, said at least one section forming rigid glassware articles from gobs of molten glass, wherein said movable components are each actuated at respective relative times in each of a plurality of machine cycles, said controller comprising:

timing means for generating a digital signal, said digital signal providing an indication of the time elapsed in each cycle of operation of said machine;

storage means, having an address input and a data output, for storing signals corresponding to the on/off statuses of said plurality of components for each of a plurality of increments of time in each cycle of operation of said machine, each of said increments of time being uniquely indicated by said digital signal;

means for applying said digital signal to said address input;

means for transferring to said data output of said storage means the signals corresponding to the on/off statuses of each of said plurality of components for the cycle time increment defined by the digital signal applied to said address input;

a plurality of component actuating means connected to said data output, each of said component actuating means being associated with at least one on/off status signal in each time increment and being responsive to each of said status signals at each time increment for controlling the operation of said components; and means for simultaneously controlling a plurality of said sections wherein each of said sections operate in a preselected interdependent time relationship with respect to one another.

3. A programmable automatic controller for controlling at least one section of a glassware forming machine, said at least one section including a plurality of movable components which operate in timed relationship with respect to one another, said at least one section forming rigid glassware articles from gobs of molten glass, wherein said movable components are each actuated at respective relative times in each of a plurality of machine cycles, said controller comprising:

a digital counter for generating a digital signal for providing an indication of the time elapsed in each cycle of operation of said machine;

storage means, having an address input and a data output, for storing signals corresponding to the on/off statuses of each of said plurality of components for a plurality of increments of time in each cycle of operation of said machine, each of said increments of time being uniquely indicated by said digital signal;

means for applying said digital signal to said address input;

means for transferring to said data output of said storage means the signals corresponding to the on/off statuses of each of said plurality of components for the cycle time increment defined by the digital signal applied to said address input; and a plurality of component actuating means connected to said data output, each of said component actuating means being associated with at least one on/off status signal in each time increment and being responsive to each of said status signals at each time increment for controlling the operation of said components.

4. A programmable automatic controller for controlling at least one section of a glassware forming machine, said at least one section including a plurality of movable components which operate in timed relationship with respect to one another, said at least one section forming rigid glassware articles from gobs of molten glass, wherein said movable components are each actuated at respective relative times in each of a plurality of machine cycles, said controller comprising:

a digital counter for generating a digital signal for providing an indication of the time elapsed in each cycle of operation of said machine;

a random access memory, having an address input and a data output, for storing the on/off statuses of said plurality of components for each of a plurality of increments of time in each cycle of operation of said machine, each of said increments of time being uniquely identified by said digital signal;

means for connecting said digital counter to said random access memory address input for addressing a selected location of said random access memory;

means for transferring to said data output of said storage means the on/off statuses of each of said plurality of components for the cycle time increment defined by the signal applied to said address input; and a plurality of component actuating means connected to said data output, each of said component actuating means being associated with at least one on/off status signal in each time increment and being responsive to each of said status signals at each time increment for controlling the operation of said components.

5. The controller as in claims 1, 2, 3 or 4 further comprising means, coupled to said storage means, for selectively varying the status of selected components at any of said plurality of increments of time to thereby change the relative times in each machine cycle during which said selected components are to be actuated.

6. A programmable automatic controller for controlling at least one section of a glassware forming machine, said at least one section including a plurality of movable components which operate in timed relationship with respect to one another, said at least one section forming rigid glassware articles from gobs of molten glass, wherein said movable components are each actuated at respective relative times in each of a plurality of machine cycles, said controller comprising:

timing means for generating a digital signal, said digital signal providing an indication of the time elapsed in each cycle of operation of said machine;

storage means, having an address input and a data output, for storing the on/off statuses of said plurality of components for each of a plurality of increments of time in each cycle of operation of said machine, each of said increments of time being uniquely indicated by said digital signal;

means for applying said digital signal to said address input;

means for transferring to said data output of said storage means the signals corresponding to the on/off statuses of each of said plurality of components for the cycle time increment defined by the digital signal applied to said address input;

means coupled to said storage means for selectively varying the signals corresponding to the on/off statuses of selected components at any of said plurality of increments of time to thereby change the relative times in each machine cycle during which said selected components are actuated; and a plurality of component actuating means connected to said data output, each of said component actuating means being associated with at least one on/off status signal in each time increment and being responsive to each of said status signals at each time increment for controlling the operation of said components.

7. A programmable automatic controller for controlling at least one section of a glassware forming machine, said at least one section including a plurality of movable components which operate in timed relationship with respect to one another, said at least one section forming rigid glassware articles from gobs of molten glass, wherein said movable components are each actuated at respective relative times in each of a plurality of machine cycles, said controller comprising:

timing means for generating a digital signal, said digital signal providing an indication of the time elapsed in each cycle of operation of said machine;

storage means, having an address input and a data output, for storing the on/off statuses of said plurality of components for each of a plurality of increments of time in each cycle of operation of said machine, each of said increments of time being uniquely indicated by said digital signal;

means for applying said digital signal to said address input;

means for transferring to said data output of said storage means the signals corresponding to the on/off statuses of each of said plurality of components for the cycle time increment defined by the digital signal applied to said address input;

switch means located adjacent to said at least one section for selectively varying the signals corresponding to the on/off statuses of selected components stored in said storage means to thereby change the relative times in each machine cycle when said selected section components are to be actuated;

a central console comprising means for selectively varying the signals corresponding to the on/off statuses of any of said sections of said machine, said varying means overriding said switch means; and a plurality of component actuating means connected to said data output, each of said component actuating means being associated with at least one on/off status signal in each time increment and being responsive to each of said status signals at each time increment for controlling the operation of said components.

8. A programmable automatic controller for controlling at least one section of a glassware forming machine, said at least one section including a plurality of movable components which operate in timed relationship with respect to one another, said at least one section forming rigid glassware articles from gobs of molten glass, wherein said movable components are each actuated at respective relative times in each of a plurality of machine cycles, said controller comprising:

timing means for generating a digital signal, said digital signal providing an indication of the time elapsed in each cycle of operation of said machine;

a first read/write memory, having an address input and a data output, for storing the on/off statuses of said plurality of components for each of a plurality of increments of time in each cycle of operation of said machine, each of said increments of time being uniquely indicated by said digital signal;

gate means for selectively connecting either a first input containing said digital signal or a second input to said first read/write memory address input;

means for transferring to said data output of said read/write memory the signals corresponding to the on/off statuses of each of said plurality of components for the cycle time increment defined by the digital signal applied to said address input;

a plurality of component actuating means connected to said data output, each of said component actuating means being associated with at least one on/off status signal in each time increment and being responsive to each of said status signals at each time increment for controlling the operation of said components;

a second read/write memory for storing the on/off statuses of said plurality of components for each of a plurality of increments of time in each cycle of operation of said machine, each of said increments of time being uniquely indicated by said digital signal;

control means for producing command signals, said control means having a component select control, an "on" and "off" function select control and a "sooner" or "later" control; and central processing means connected to said control means, to said first read/write memory, to said second read/write memory, and to said gate means, said central processing means having internal generating means for generating an address signal, said gate means' second input being responsive to said address signal, said central processing means for altering the contents of a location in said second read/write memory in accordance with said command signal, for controlling said gate means, and for controlling the transfer of data from the location in said second read/write memory to the location in said first read/write memory indicated by said address signal.

9. The controller of claim 8 wherein said varying means comprises:

read/write memory means for storing the on/off statuses of said plurality of components for each of a plurality of increments of time in each cycle of operation of said machine, each of said increments of time being uniquely indicated by said digital signal;

control means for producing command signals, said control means having a component select control, an "on" function and "off" function select control and a "sooner" and "later" control;

gate means, for selectively connecting either a first input containing said digital signal or a second input to said address input of said storage means; and central processing means connected to said control means, to said read/write memory, to said storage means, and to said gate means, said central processing means having internal generating means for generating an address signal, said gate means second input responsive to said address signal, said central processing means for altering the contents of a location in said read/write memory means in accordance with said command signals, for controlling said gate means, and for controlling the transfer of data from the location in said read/write memory means to the location in said storage means indicated by said address signal.

10. A method of controlling at least one section of a glassware forming machine, said at least one section including a plurality of movable components which operate in timed relationship with respect to one another, said at least one section forming rigid glassware articles from gobs of molten glass, wherein said movable components are each actuated at respective relative times in each of a plurality of machine cycles, said method comprising the steps of:

generating a digital signal for providing an indication of the time elapsed in each cycle of operation of said machine;

storing signals corresponding to the on/off statuses of said plurality of components for each of a plurality of increments of time in each cycle of operation of said machine in a storage;

reading out from said storage each of the on/off statuses of said plurality of components for the cycle time increment indicated by said digital signal; and coupling said on/off status signal to each of a plurality of component actuating means connected to said data output, each of said component actuating means being associated with at least one on/off status signal in each time increment and being responsive to each of said status signals at each time increment for controlling the operation of said components.

11. The controller of claim 11 or 10 further comprising means for controlling a plurality of machines wherein each of said machines operates in a preselected interdependent timed relationship with respect to one another.

12. The controller as in claim 1 or 10 wherein said timing means comprises a digital counter.

13. The controller as in claim 1 or 10 wherein said storage means comprises a random access memory.

14. A method of controlling at least one section of a glassware forming machine, said at least one section including a plurality of movable components which operate in timed relationship with respect to one another, said at least one section forming rigid glassware articles from gobs of molten glass, wherein said movable components are each actuated at respective relative times in each of a plurality of machine cycles, said method comprising the steps of:

generating a digital signal for providing an indication of the time elapsed in each cycle of operation of said machine;

storing signals corresponding to the on/off statuses of said plurality of components for each of a plurality of increments of time in each cycle of operation of said machine in a storage;

reading out from said storage each of the on/off statuses of said plurality of components for the cycle time increment indicated by said digital signal;

coupling said on/off status signals to each of a plurality of component actuating means connected to said data output, each of said component actuating means being associated with at least one on/off status signal in each time increment and being responsive to each of said status signals at each time increment for controlling the operation of said components; and simultaneously controlling a plurality of said sections wherein each of said sections operates in a preselected interdependent timed relationship with respect to one another.

15. The method of controlling at least one section of a glassware forming machine, said at least one section including a plurality of movable components which operate in timed relationship with respect to one another, said at least one section forming rigid glassware articles from gobs of molten glass, wherein said movable components are each actuated at respective relative times in each of a plurality of machine cycles, said method comprising the steps of:

generating a digital signal providing an indication of the time elapsed in each cycle of operation of said machine;

storing signals corresponding to the on/off statuses of said plurality of components for each of a plurality of increments of time in each cycle of operation of said machine in a storage, each of said increments of time being uniquely indicated by said digital signal;

coupling said signals corresponding to the on/off statuses to component actuating means, each of said component actuating means being associated with at least one on/off status signal in each time increment;

reading out from said storage each of the signals corresponding to the on/off statuses of said plurality of components for the cycle time increment indicated by said digital signal;

generating in each of said component actuating means, a component operating command to components having an "on" status as indicated by said reading out step;

selectively changing said signals corresponding to said on/off statuses to thereby vary relative times in each machine cycle during which said selected components are to be actuated, said first varying step occurring at a location adjacent to said section;

controlling the operational condition of said section at any time during a machine cycle from a location adjacent to said section;

selectively varying said signals corresponding to said on/off statuses of selected components of any of said sections of said machine from a central console remote from said section, said second varying step overriding said first varying step; and controlling the operational condition of any of said sections from a central console remote from said section, said second controlling step overriding said first controlling step.

16. A method for controlling at least one section of a glassware forming machine, said at least one section including a plurality of movable components which operate in timed relationship with respect to one another, said at least one section forming rigid glassware articles from gobs of molten glass, wherein said movable components are each actuated at respective relative times in each of a plurality of machine cycles, said method comprising the steps of:

generating a digital signal, said digital signal providing an indication of the time elapsed in each cycle of operation of said machine;

storing signals corresponding to the on/off statuses of said plurality of components for each of a plurality of increments of time in each cycle of operation of said machine in a storage, each of said increments of time being uniquely indicated by said digital signal;

coupling said signals corresponding to the on/off statuses to component actuating means, each of said component actuating means being associated with at least one on/off status signal in each time increment;

selectively varying the signals corresponding to said on/off statuses stored in said storage to thereby change the relative times in each machine cycle during which said selected components are to be actuated;

reading out from said storage the signals corresponding to the on/off statuses of each of said plurality of components for the cycle time increment indicated by said digital signal; and generating in each of said component actuating means a component operating command to components having an "on" status as indicated by said reading out step.

17. A method of controlling at least one section of a glassware forming machine, said at least one section including a plurality of movable components which operate in timed relationship with respect to one another, said at least one section forming rigid glassware articles from gobs of molten glass, wherein said movable components are each actuated at respective relative times in each of a plurality of machine cycles, said method comprising the steps of:

generating a digital signal, said digital signal providing an indication of the time elapsed in each cycle of operation of said machine;

storing the signals corresponding to the on/off statuses of said plurality of components for each of a plurality of increments of time in each cycle of operation of said machine in a first read/write memory, each of said increments of time being uniquely indicated by said digital signal;

storing the signals corresponding to the on/off statuses of said plurality of components for each of a plurality of increments of time in each cycle of operation of said machine in a second read/write memory, each of said increments of time being uniquely indicated by said digital signal;

selectively connecting either a first input containing said digital signal or a second input to an address input of said first read/write memory;

reading out from said first read/write memory the signals corresponding to the on/off statuses of each of said plurality of components for the cycle time indicated by said digital signal when said digital is applied to said address input;

coupling said signals corresponding to the on/off statuses to component actuating means, each of said component actuating means being associated with at least one on/off status signal in each time increment;

generating in said component actuating means, a component operating command to components having an "on" status as indicated by said reading out step;

producing command signals to control the varying of the actuating times of selected components to change the relative times in each machine cycle during which said selected components are to be actuated, said command signal producing step producing signals representative of the component selected, whether an "on" or an "off" function is to be varied, and the degree to which the particular component function is to be advanced or delayed;

generating an address signal, said second input of said connecting step being responsive to said address signal;

altering the contents of a location in said second read/write memory in accordance with said command signals producing step; and transferring the data from the location in said second read/write memory to the location in said first read/write memory indicated by said address signal.

18. In a glass forming machine having a plurality of sections, each of which includes a plurality of movable components which operate in timed relationship with respect to one another, said sections forming rigid glassware articles from gobs of molten glass, wherein said movable components are each actuated at respective relative times in each of a plurality of machine cycles, a controller for controlling at least one section of said glassware forming machine comprising:

timing means for generating a signal which provides an indication of the time elapsed in each cycle of operation of said machine;

storage means, having an address input and data output, for storing signals corresponding to component operation commands for each of said plurality of components over each of a plurality of increments of time in each cycle of operation of said machine, each of said increments of time being uniquely indicated by said signal;

means for applying said signal to said address input;

means for transferring to said data output of said storage means the signals corresponding to the operation commands of each of said plurality of components for the cycle time increment defined by the signal applied to said address input; and a plurality of component actuating means connected to said data output, each of said component actuating means being associated with at least one operation command in each time increment and being responsive to said operating commands at each time increment for controlling the operation of said components.

* * * * *